United States Patent [19]
Shirai et al.

[11] Patent Number: 5,574,463
[45] Date of Patent: Nov. 12, 1996

[54] OBSTACLE RECOGNITION SYSTEM FOR A VEHICLE

[75] Inventors: Noriaki Shirai, Oobu; Katsuhiko Hibino, Toyoake; Takao Nishimura, Nagoya, all of Japan

[73] Assignee: Nippondenso Co., Ltd., Kariya, Japan

[21] Appl. No.: 449,116

[22] Filed: May 24, 1995

[30] Foreign Application Priority Data

May 26, 1994 [JP] Japan .................................. 6-112779

[51] Int. Cl.$^6$ ............................ G01S 13/93; G01S 13/60
[52] U.S. Cl. .............................. 342/70; 342/115; 342/90; 342/157; 342/158
[58] Field of Search .................................. 342/70, 71, 72, 342/107, 109, 110, 115, 157, 158, 90

[56] References Cited

U.S. PATENT DOCUMENTS

| | | | |
|---|---|---|---|
| 3,952,303 | 4/1976 | Watanabe et al. | 342/112 |
| 4,203,113 | 5/1980 | Baghdady | 342/71 |
| 5,291,207 | 3/1994 | Kikuchi et al. | 342/70 |

FOREIGN PATENT DOCUMENTS

| | | |
|---|---|---|
| 5180933 | 7/1993 | Japan . |
| 5180934 | 7/1993 | Japan . |

*Primary Examiner*—John B. Sotomayor
*Attorney, Agent, or Firm*—Cushman Darby & Cushman, L.L.P.

[57] ABSTRACT

A radar device emits a wave beam into a given angular range outside a vehicle, and scans the given angular range by the wave beam. The radar device detects a reflected wave beam. A recognizing device is operative for recognizing an obstacle with respect to the vehicle on the basis of the result of detection of the reflected wave beam by the radar device. In the recognizing device, a point recognizing section recognizes obstacles as points, and a uniting section is operative for uniting adjacent points among the points provided by the point recognizing section. The uniting section provides sets each having adjacent points. A line-segment recognizing section is operative for detecting a specific set or specific sets of adjacent points among the adjacent-point sets provided by the uniting section, and for recognizing every detected specific set as a line segment having a length only along a width direction of the vehicle. Every specific set has a length smaller than a given length along a longitudinal direction of the vehicle. A position estimating section estimates the position of a line segment, which will be provided by the line-segment recognizing section, in response to the position of a previously-provided line segment. An identity judging section is operative for comparing the line-segment position estimated by the position estimating section and the position of a line segment currently provided by the line-segment recognizing section to judge whether or not the line segment currently provided by the line-segment recognizing section and the previously-provided line segment are the same.

3 Claims, 8 Drawing Sheets

OBSTACLE RECOGNITION SYSTEM FOR A VEHICLE

BACKGROUND OF THE INVENTION

1. Field of the Invention

This invention generally relates to an obstacle recognition system for a vehicle. This invention specifically relates to a system including a radar device for scanning a range outside a subject vehicle by a light beam or a radio wave beam, and a recognition device for processing an output signal of the radar device to recognize or detect an obstacle with respect to the subject vehicle.

2. Description of the Prior Art

Some of known obstacle recognition systems scan a given angular range outside a subject vehicle by a light beam or a millimeter radio wave beam. During the scanning process, the beam is emitted into the given range from a transmitter on the subject vehicle, and a reflected or echo beam is received by a receiver on the subject vehicle. An obstacle in the given range is recognized or detected in response to the reception of the reflected beam.

Such an obstacle recognition system is used as a part of a forward obstacle warning system which serves to detect an obstacle such as a preceding vehicle ahead of a subject vehicle and to generate an alarm when there is a possibility of collision between the subject vehicle and the obstacle.

The obstacle recognition system can also be used as a part of a system for detecting the position of a preceding vehicle relative to a subject vehicle, and for automatically controlling the distance between the subject vehicle and the preceding vehicle in response to the detected position of the preceding vehicle.

Japanese published unexamined patent application 5-180933 (corresponding to U.S. Pat. No. 5,291,207) and Japanese published unexamined patent application 5-180934 disclose a system for estimating the position of an obstacle with respect to a subject vehicle which includes a radar device. In the system of Japanese applications 5-180933 and 5-180934, obstacles are detected in response to the reception of reflected beams during a scanning process. Each detected obstacle is represented by a set of equal-area blocks in orthogonal coordinates, and the position of gravity center of the detected obstacle is determined. In addition, the position of gravity center of each detected obstacle is pre-estimated. When the determined position of gravity center of a detected obstacle substantially corresponds to the pre-estimated position of gravity center of a detected obstacle, the obstacles are regarded as a same obstacle.

SUMMARY OF THE INVENTION

It is an object of this invention to provide an improved obstacle recognition system for a vehicle.

A first aspect of this invention provides an obstacle recognition system for a vehicle which comprises a) radar means for emitting a wave beam into a given angular range outside the vehicle and scanning the given angular range by the wave beam, and for detecting a reflected wave beam; and b) recognizing means for recognizing an obstacle with respect to the vehicle on the basis of the result of detection of the reflected wave beam by the radar means; wherein the recognizing means comprises b1) point recognizing means for recognizes obstacles as points on the basis of the result of detection of the reflected wave beam by the radar means; b2) uniting means for uniting adjacent points among the points provided by the point recognizing means, and for providing sets each having adjacent points; b3) line-segment recognizing means for detecting a specific set or specific sets of adjacent points among the adjacent-point sets provided by the uniting means, and for recognizing every detected specific set as a line segment having a length only along a width direction of the vehicle, wherein every specific set has a length smaller than a given length along a longitudinal direction of the vehicle; b4) position estimating means for estimating the position of a line segment, which will be provided by the line-segment recognizing means, in response to the position of a previously-provided line segment; and b5) identity judging means for comparing the line-segment position estimated by the position estimating means and the position of a line segment currently provided by the line-segment recognizing means to judge whether or not the line segment currently provided by the line-segment recognizing means and the previously-provided line segment are the same.

A second aspect of this invention provides an obstacle recognition system for a vehicle which comprises a) radar means for emitting a wave beam into a given angular range outside the vehicle and scanning the given angular range by the wave beam, and for detecting a reflected wave beam; and b) recognizing means for recognizing an obstacle with respect to the vehicle on the basis of the result of detection of the reflected wave beam by the radar means; wherein the recognizing means comprises b1) point recognizing means for recognizes obstacles as points on the basis of the result of detection of the reflected wave beam by the radar means; b2) uniting means for uniting adjacent points among the points provided by the point recognizing means, and for providing sets each having adjacent points; b3) line-segment recognizing means for recognizing each of the adjacent-point sets as a line segment having a length only along a width direction of the vehicle; b4) position estimating means for estimating the position of a line segment, which will be provided by the line-segment recognizing means, in response to the position of a previously-provided line segment; b5) identity judging means for comparing the line-segment position estimated by the position estimating means and the position of a line segment currently provided by the line-segment recognizing means to judge whether or not the line segment currently provided by the line-segment recognizing means and the previously-provided line segment are the same; and b6) line-segment excepting means for, in cases where the number of line segments currently provided by the line-segment recognizing means exceeds a given number, detecting a specific line segment or specific line segments among the currently-provided line segments and excluding the specific line segment or at least one of the specific line segments from a next position estimating process and a next identity judging process executed by the position estimating means and the identity Judging means, wherein the specific line segment or the specific line,segments are judged by the identity judging means as being different from previously-provided line segments.

A third aspect of this invention is based on the second aspect of this invention, and provides an obstacle recognition system wherein the line-segment excepting means is operative for, in cases where the number of line segments currently provided by the line-segment recognizing means exceeds the given number, sequentially excluding the specific line segments in the order according to the degrees of the separations of the specific line segments from the vehicle, wherein the number of the excluded specific line

DESCRIPTION OF THE PREFERRED EMBODIMENTS

First Embodiment

Figure 1:
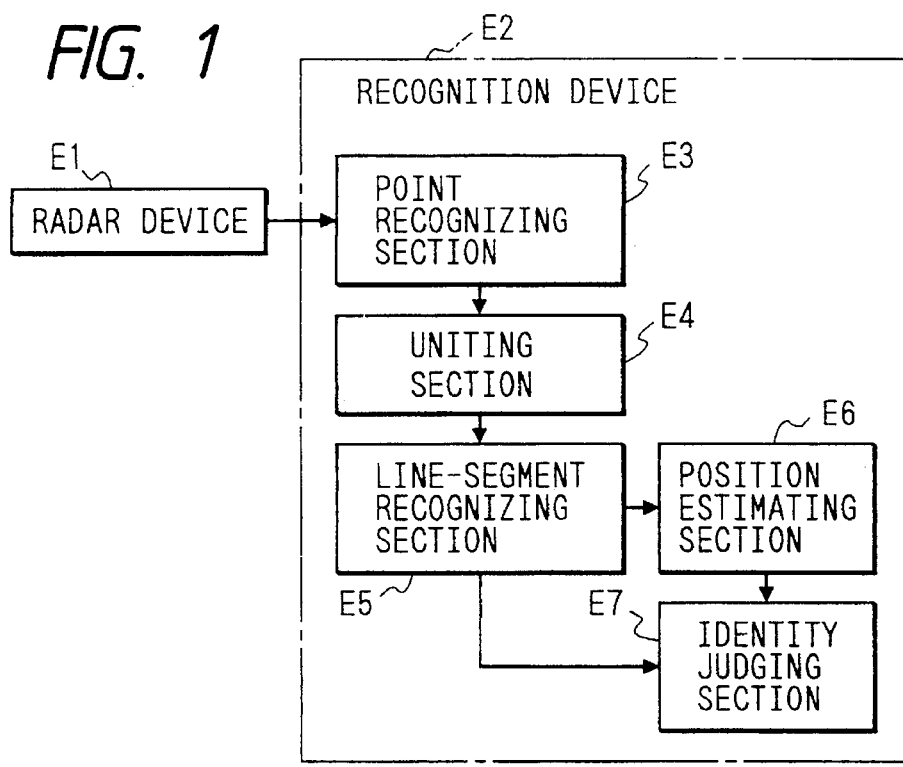
FIG. 1 is a block diagram of an obstacle recognition system for a vehicle according to a first embodiment of this invention.

With reference to FIG. 1, an obstacle recognition system for a vehicle includes a radar device E1 and a recognition device E2. The radar device E1 and the recognition device E2 are connected to each other.

The recognition device E2 includes a point recognizing section E3, a uniting section E4, a line-segment recognizing section E5, a position estimating section E6, and an identity judging section E7. The point recognizing section E3 is connected to the radar device E1 and the uniting section E4. The uniting section E4 is connected to the line-segment recognizing section E5. The position estimating section E6 is connected to the line-segment recognizing section E5. The identity judging section E7 is connected to the line-segment recognizing section E5 and the position estimating section E6.

The radar device E1 emits a wave beam into a given angular range outside a subject vehicle, and scans the given angular range by the wave beam. The radar device E1 detects a reflected wave beam caused by an object in the given angular range. The recognition device E2 recognizes an obstacle with respect to the subject vehicle on the basis of the result of detection of the reflected wave beam by the radar device E1.

In the recognition device E2, the point recognizing section E3 recognizes every obstacle as points on the basis of the result of detection of the reflected wave beam by the radar device E1. The uniting section E4 unites adjacent points among the points provided by the point recognizing section E3. The uniting section E4 provides sets each having adjacent points. These sets are referred to as the adjacent-point sets.

In the recognition device E2, the line-segment recognizing section E5 detects a specific set or specific sets of adjacent points among the adjacent-point sets provided by the uniting section E4. Every specific set has a length smaller than a given length along the longitudinal direction of the subject vehicle. The line-segment recognizing section E5 recognizes every detected specific set as a line segment having a length only along the width direction of the subject vehicle.

In the recognition device E2, the position estimating section E6 estimates the position of a line segment, which will be provided by the line-segment recognizing section E5, in response to the position of a previously-provided line segment. The identity judging section E7 compares the line-segment position estimated by the position estimating section E6 and the position of a line segment currently provided by the line-segment recognizing section E5 to judge whether or not the line segment currently provided by the line-segment recognizing section E5 and the previously-provided line segment are the same. Here, "same" means that the currently-provided line segment and the previously-provided line segment correspond to the same obstacle.

According to this embodiment, it is possible to suitably judge whether or not a currently-recognized obstacle and a previously-recognized obstacle are the same.

In this embodiment, an obstacle is recognized as a line segment having a length only along the width direction of the subject vehicle. Therefore, the number of necessary parameters denoting an obstacle is smaller than the number of necessary parameters which occur in the case where the obstacle is recognized as a shape equal to the original shape thereof. The smaller number of necessary parameters simplifies a process of estimating a future position of an obstacle, and a process of judging whether or not a currently-recognized obstacle and a previously-recognized obstacle are the same.

In this embodiment, the line-segment recognizing section E5 disregards adjacent-point sets having lengths equal to or greater than the given length along the longitudinal direction of the subject vehicle. Accordingly, it is possible to neglect a guardrail or a similar thing elongated along a road side. This neglect further simplifies a process of estimating a future position of an obstacle, and a process of judging whether or not a currently-recognized obstacle and a previously-recognized obstacle are the same.

Second Embodiment

Figure 2:
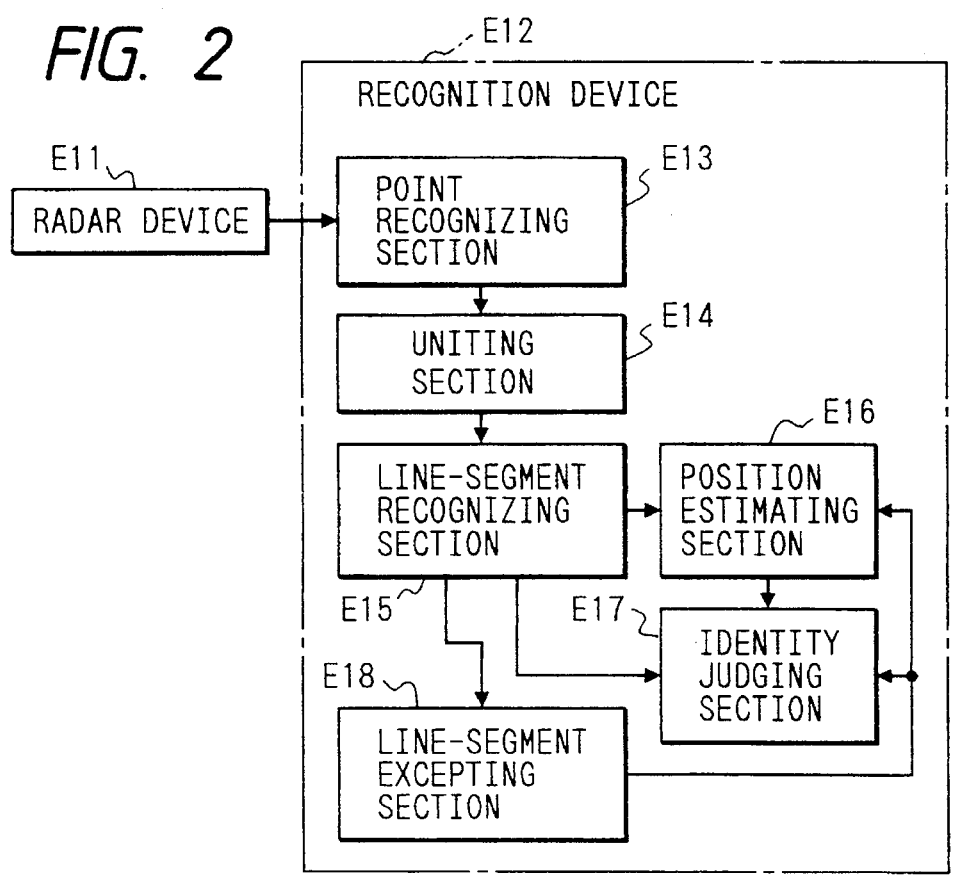
FIG. 2 is a block diagram of an obstacle recognition system for a vehicle according to a second embodiment of this invention.

With reference to FIG. 2, an obstacle recognition system for a vehicle includes a radar device E11 and a recognition device E12. The radar device E11 and the recognition device E12 are connected to each other.

The recognition device E12 includes a point recognizing section E13, a uniting section E14, a line-segment recognizing section E15, a position estimating section E16, an identity judging section E17, and a line-segment excepting section E18. The point recognizing section E13 is connected to the radar device E11 and the uniting section E14. The uniting section E14 is connected to the line-segment recognizing section E15. The position estimating section E16 is connected to the line-segment recognizing section E15. The identity Judging section E17 is connected to the line-segment recognizing section E15 and the position estimating section E16. The line-segment excepting section E18 is connected to the line-segment recognizing section E15, the position estimating section E16, and the identity judging section E17.

The radar device E11 emits a wave beam into a given angular range outside a subject vehicle, and scans the given angular range by the wave beam. The radar device E11 detects a reflected wave beam caused by an object in the given angular range. The recognition device E12 recognizes an obstacle with respect to the subject vehicle on the basis of the result of detection of the reflected wave beam by the radar device E11.

In the recognition device E12, the point recognizing section E13 recognizes every obstacle as points on the basis of the result of detection of the reflected wave beam by the radar device E11. The uniting section E14 unites adjacent points among the points provided by the point recognizing section E13. The uniting section E14 provides sets each having adjacent points. These sets are referred to as the adjacent-point sets.

In the recognition device E12, the line-segment recognizing section E15 is informed of the adjacent-point sets provided by the uniting section E14. The line-segment recognizing section E15 recognizes every adjacent-point set as a line segment having a length only along the width direction of the subject vehicle.

In the recognition device E12, the position estimating section E16 estimates the position of a line segment, which will be provided by the line-segment recognizing section E15, in response to the position of a previously-provided line segment. The identity judging section E17 compares the line-segment position estimated by the position estimating section E16 and the position of a line segment currently provided by the line-segment recognizing section E15 to judge whether or not the line segment currently provided by the line-segment recognizing section E15 and the previously-provided line segment are the same. Here, "same" means that the currently-provided line segment and the previously-provided line segment correspond to the same obstacle.

In the case where the number of line segments currently provided by the line-segment recognizing section E15 exceeds a given number, the line-segment excepting section E18 detects a specific line segment or specific line segments among the currently-provided line segments. The specific line segment or the specific line segments are judged by the identity judging section E17 as being different from previously-provided line segments. The line-segment excepting section E18 excludes the specific line segment or at least one of the specific line segments from a next position estimating process and a next identity judging process executed by the position estimating section E16 and the identity judging section E17.

In this embodiment, an obstacle is recognized as a line segment having a length only along the width direction of the subject vehicle. Therefore, the number of necessary parameters denoting an obstacle is smaller than the number of necessary parameters which occur in the case where the obstacle is recognized as a shape equal to the original shape thereof. The smaller number of necessary parameters simplifies a process of estimating a future position of an obstacle, and a process of judging whether or not a currently-recognized obstacle and a previously-recognized obstacle are the same.

According to this embodiment, in the case where the number of line segments currently provided by the line-segment recognizing section E15 exceeds a given number, detection is given of a specific line segment or specific line segments among the currently-provided line segments. The specific line segment or the specific line segments are judged by the identity judging section E17 as being different from previously-provided line segments. The specific line segment or at least one of the specific line segments is excluded from a next position estimating process and a next identity judging process executed by the position estimating section E16 and the identity judging section E17. Therefore, the number of continuously pursued obstacles, which relate to currently-provided line segments judged by the identity judging section E17 as previously-provided line segments, is generally limited to the given number or less. The limitation on the number of continuously pursued obstacles simplifies a process of judging whether or not a currently-recognized obstacle and a previously-recognized obstacle are the same.

In general, there is a certain upper limit of the number of obstacles which should be considered among obstacles detected via the radar device E11. Examples of the obstacles which should be considered are preceding vehicles with respect to the subject vehicle. In most of cases where the number of obstacles detected via the radar device E11 is greater than the certain upper limit of the number of obstacles which should be considered, one or more of the obstacles detected via the radar device E11 agree with negligible road-side things. Accordingly, provided that the limitation on the number of continuously pursued obstacles is designed in view of the certain upper limit of the number of obstacles which should be considered, overlooking obstacles requiring consideration can be prevented.

Third Embodiment

Figure 3:
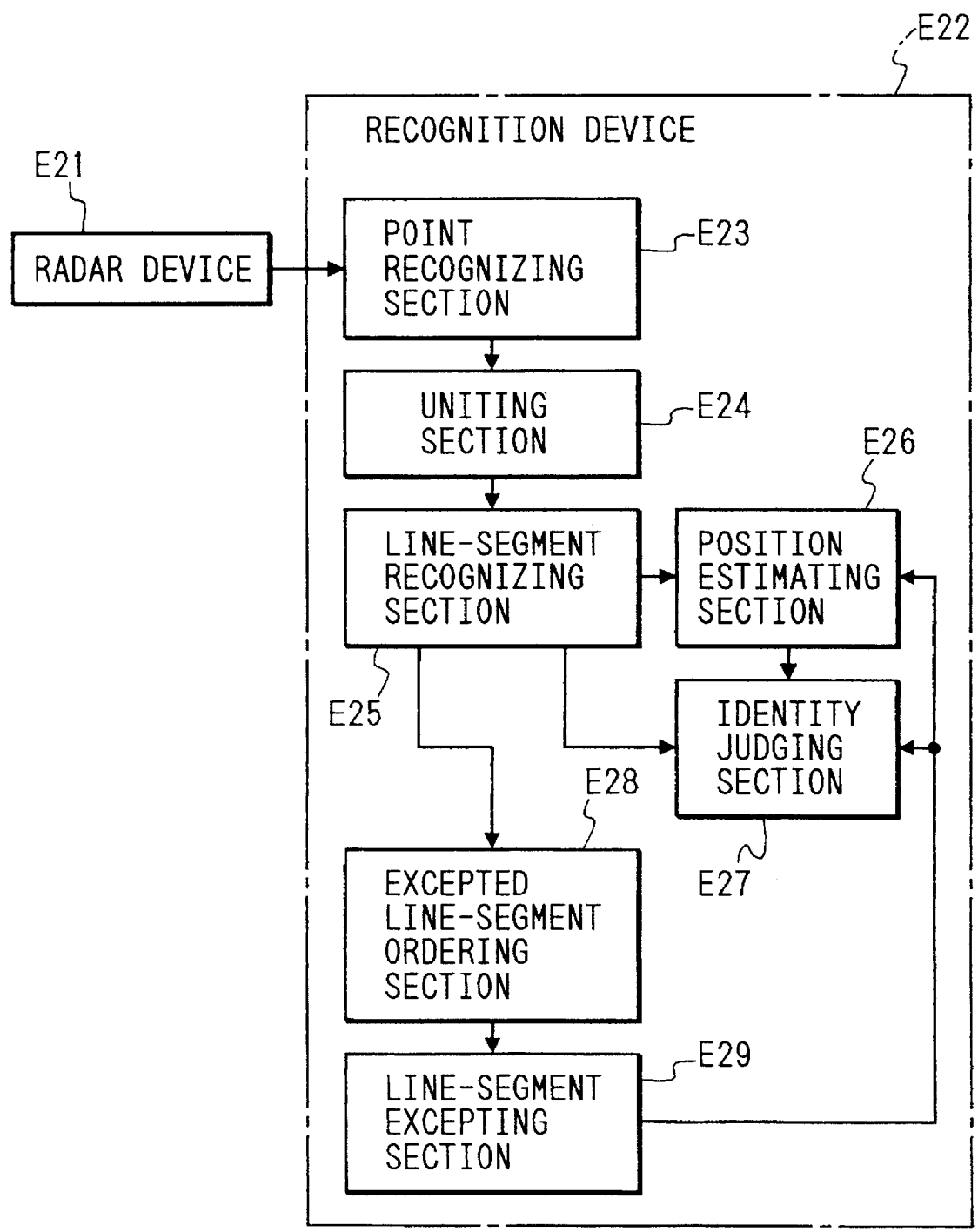
FIG. 3 is a block diagram of an obstacle recognition system for a vehicle according to a third embodiment of this invention.

With reference to FIG. 3, an obstacle recognition system for a vehicle includes a radar device E21 and a recognition device E22. The radar device E21 and the recognition device E22 are connected to each other.

The recognition device E22 includes a point recognizing section E23, a uniting section E24, a line-segment recognizing section E25, a position estimating section E26, an identity judging section E27, an excepted line-segment ordering section E28, and a line-segment excepting section E29. The point recognizing section E23 is connected to the radar device E21 and the uniting section E24. The uniting section E24 is connected to the line-segment recognizing section E25. The position estimating section E26 is connected to the line-segment recognizing section E25. The identity judging section E27 is connected to the line-segment recognizing section E25 and the position estimating section E26. The excepted line-segment ordering section E28 is connected to the line-segment recognizing section E25. The line-segment excepting section E29 is connected to the position estimating section E26, the identity judging section E27, and the excepted line-segment ordering section E28.

The radar device E21 emits a wave beam into a given angular range outside a subject vehicle, and scans the given angular range by the wave beam. The radar device E21 detects a reflected wave beam caused by an object in the given angular range. The recognition device E22 recognizes an obstacle with respect to the subject vehicle on the basis of the result of detection of the reflected wave beam by the radar device E21.

In the recognition device E22, the point recognizing section E23 recognizes every obstacle as points on the basis of the result of detection of the reflected wave beam by the radar device E21. The uniting section E24 unites adjacent points among the points provided by the point recognizing section E23. The uniting section E24 provides sets each having adjacent points. These sets are referred to as the adjacent-point sets.

In the recognition device E22, the line-segment recognizing section E25 is informed of the adjacent-point sets provided by the uniting section E24. The line-segment recognizing section E25 recognizes every adjacent-point set as a line segment having a length only along the width direction of the subject vehicle.

In the recognition device E22, the position estimating section E26 estimates the position of a line segment, which will be provided by the line-segment recognizing section E25, in response to the position of a previously-provided line segment. The identity judging section E27 compares the line-segment position estimated by the position estimating section E26 and the position of a line segment currently provided by the line-segment recognizing section E25 to judge whether or not the line segment currently provided by the line-segment recognizing section E25 and the previously-provided line segment are the same. Here, "same" means that the currently-provided line segment and the previously-provided line segment correspond to the same obstacle.

In the case where the number of line segments currently provided by the line-segment recognizing section E25 exceeds a given number, the line-segment excepting section E29 detects a specific line segment or specific line segments among the currently-provided line segments. The specific line segment or the specific line segments are judged by the identity judging section E27 as being different from previously-provided line segments. The line-segment excepting section E29 excludes the specific line segment or at least one of the specific line segments from a next position estimating process and a next identity judging process executed by the position estimating section E26 and the identity judging section E27.

In the case where the number of line segments currently provided by the line-segment recognizing E25 exceeds the given number, the excepted line-segment ordering section E28 enables the line-segment excepting section E29 to sequentially exclude the specific line segments in the order according to the degrees of the separations of the specific line segments from the vehicle. The number of the excluded specific line segments is equal to the total number of the line segments provided by the line-segment recognizing section E25 minus the given number.

In this embodiment, an obstacle is recognized as a line segment having a length only along the width direction of the subject vehicle. Therefore, the number of necessary parameters denoting an obstacle is smaller than the number of necessary parameters which occur in the case where the obstacle is recognized as a shape equal to the original shape thereof. The smaller number of necessary parameters simplifies a process of estimating a future position of an obstacle, and a process of judging whether or not a currently-recognized obstacle and a previously-recognized obstacle are the same.

According to this embodiment, in the case where the number of line segments currently provided by the line-segment recognizing section E25 exceeds a given number, detection is given of a specific line segment or specific line segments among the currently-provided line segments. The specific line segment or the specific line segments are judged by the identity judging section E27 as being different from previously-provided line segments. The specific line segment or at least one of the specific line segments is excluded from a next position estimating process and a next identity judging process executed by the position estimating section E26 and the identity judging section E27. Therefore, the number of continuously pursued obstacles, which relate to currently-provided line segments judged by the identity judging section E27 as previously-provided line segments, is generally limited to the given number or less. The limitation on the number of continuously pursued obstacles simplifies a process of judging whether or not a currently-recognized obstacle and a previously-recognized obstacle are the same.

In general, there is a certain upper limit of the number of obstacles which should be considered among obstacles detected via the radar device E21. Examples of the obstacles which should be considered are preceding vehicles with respect to the subject vehicle. In most of cases where the number of obstacles detected via the radar device E21 is greater than the certain upper limit of the number of obstacles which should be considered, one or more of the obstacles detected via the radar device E21 agree with negligible road-side things. Accordingly, provided that the limitation on the number of continuously pursued obstacles is designed in view of the certain upper limit of the number of obstacles which should be considered, overlooking obstacles requiring consideration can be prevented.

According to this embodiment, in the case where the number of line segments currently provided by the line-segment recognizing E25 exceeds the given number, the excepted line-segment ordering section E28 enables the line-segment excepting section E29 to sequentially exclude the specific line segments in the order according to the degrees of the separations of the specific line segments from the vehicle. The number of the excluded specific line segments is equal to the total number of the line segments provided by the line-segment recognizing section E25 minus the given number. Thus, the specific line segments are sequentially excluded in the order according to the degrees of the separations of the specific line segments from the vehicle so that the total number of considered line-segments will be equal to the given number. Therefore, it is possible to more suitably recognize an obstacle which has a high chance of affecting a subject vehicle's safety. Even when the given number is set small, the subject vehicle's safety can be maintained. In addition, it is possible to further simplify a process of judging whether or not a currently-recognized obstacle and a previously-recognized obstacle are the same.

Fourth Embodiment

Figure 4:
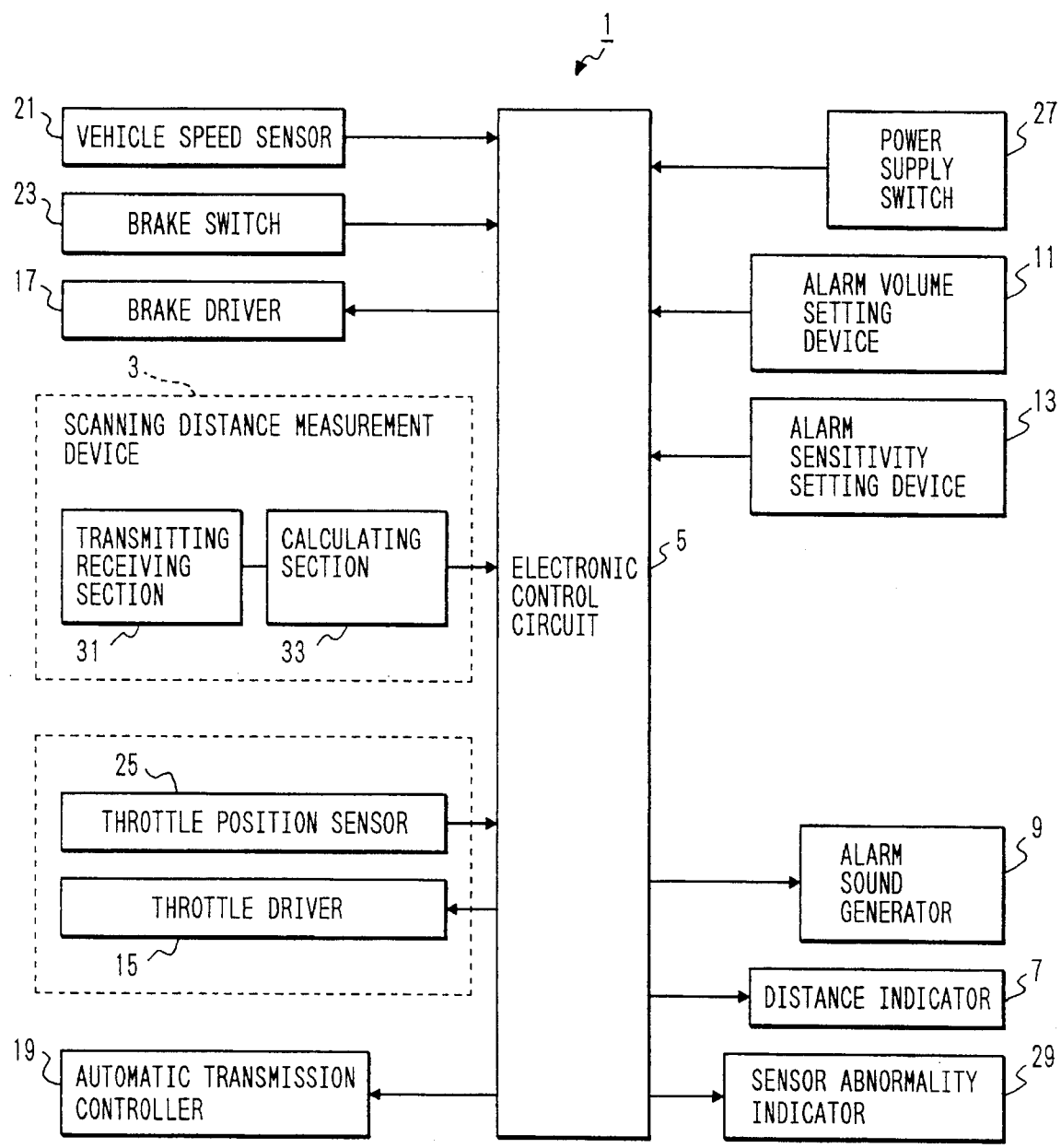
FIG. 4 is a block diagram of a vehicle control system containing an obstacle recognition system according to a fourth embodiment of this invention.

FIG. 4 shows a vehicle control system 1 containing an obstacle recognition system according to a fourth embodiment of this invention. The vehicle control system 1 includes a scanning distance measurement device 3 serving as a radar device.

The scanning distance measurement device 3 is mounted on a front of a subject vehicle. The scanning distance measurement device 3 detects a preceding vehicle ahead of the subject vehicle. When the detected preceding vehicle enters a given warning area set in front of the subject vehicle, the vehicle control system 1 executes a given control process. The given control process can be changed among three different types. The vehicle control system 1 includes a manual mode selection switch (not shown). When the mode selection switch is in a first position, the given control process executed by the vehicle control system 1 agrees with a collision avoiding process having a step of generating an alarm sound. When the mode selection switch is in a second position, the given control process executed by the vehicle control system 1 agrees with a travel controlling process having a step of controlling the speed of the subject vehicle to maintain the distance between the subject vehicle and the preceding vehicle at a given distance. When the mode selection switch is in a third position, the given control process executed by the vehicle control system 1 agrees with a combination of the collision avoiding process and the travel controlling process.

A detection signal outputted from the scanning distance measurement device 3 is fed to an electronic control circuit 5. As will be described later, the electronic control circuit 5 recognizes a preceding vehicle ahead of the subject vehicle in response to the output signal of the scanning distance measurement device 3. Furthermore, the electronic control circuit 5 generates an indicator drive signal in response to the result of the recognition. The indicator drive signal represents the distance between the subject vehicle and the preceding vehicle. The electronic control circuit 5 outputs the indicator drive signal to a distance indicator 7 so that the distance between the subject vehicle and the preceding vehicle will be indicated thereby.

In the case where the mode selection switch is in the first position to select the collision avoiding process, when the preceding vehicle enters the waning area, the electronic control circuit 5 outputs a drive signal to an alarm sound generator 9 so that an alarm sound will be produced by the alarm sound generator 9. An alarm volume setting device 11 and an alarm sensitivity setting device 13 are connected to the electronic control circuit 5. The electronic control circuit 5 adjusts the volume of the alarm sound in response to the output signal of the alarm volume setting device 11. The electronic control circuit 5 adjusts the sensitivity of the generation of an alarm sound in response to the output signal of the alarm sensitivity setting device 13.

During the execution of the travel controlling process, the electronic control circuit 5 serves to adjust the speed of the subject vehicle. To this end, the electronic control circuit 5 is connected to a throttle driver 15, a brake driver 17, and an automatic transmission controller 19. The throttle driver 15 serves to actuate a throttle valve (not shown) of a vehicle powering engine. The brake driver 17 serves to actuate a brake of the subject vehicle. The automatic transmission controller 19 serves to adjust an automatic transmission of the subject vehicle. During the execution of the travel controlling process, the electronic control circuit 5 outputs drive signals to the throttle driver 15, the brake driver 17, and the automatic transmission controller 19 to control the speed of the subject vehicle.

A vehicle speed sensor 21, a brake switch 23, and a throttle position sensor 25 are connected to the electronic control circuit 5. The vehicle speed sensor 21 outputs a signal representing the speed of the subject vehicle. The output signal of the vehicle speed sensor 21 is fed to the electronic control circuit 5. The brake switch 23 outputs a signal representing conditions of operation of the brake. The output signal of the brake switch 23 is fed to the electronic control circuit 5. The throttle position sensor 25 outputs a signal representing the degree of opening of the throttle valve, that is, the position of the throttle valve. The output signal of the throttle position sensor 25 is fed to the electronic control circuit 5. The information pieces represented by the output signals of the vehicle speed sensor 21, the brake switch 23, and the throttle position sensor 25 are used in the collision avoiding process and the travel controlling process.

The electronic control circuit 5 is connected to a power supply switch 27. When the power supply switch 27 changes from an off position to an on position in response to operation of an engine key switch (not shown), a power supply circuit (not shown) feeds electric power to the electronic control circuit 5 so that the electronic control circuit 5 starts to operate.

The electronic control circuit 5 is connected to a sensor abnormality indicator 29. The electronic control circuit 5 detects the occurrence of an abnormality in each of the sensors 21, 23, and 25. The electronic control circuit 5 generates a drive signal representing the occurrence of a sensor abnormality, and outputs the drive signal to the sensor abnormality indicator 29 so that the occurrence of the sensor abnormality will be indicated thereby.

Figure 5:
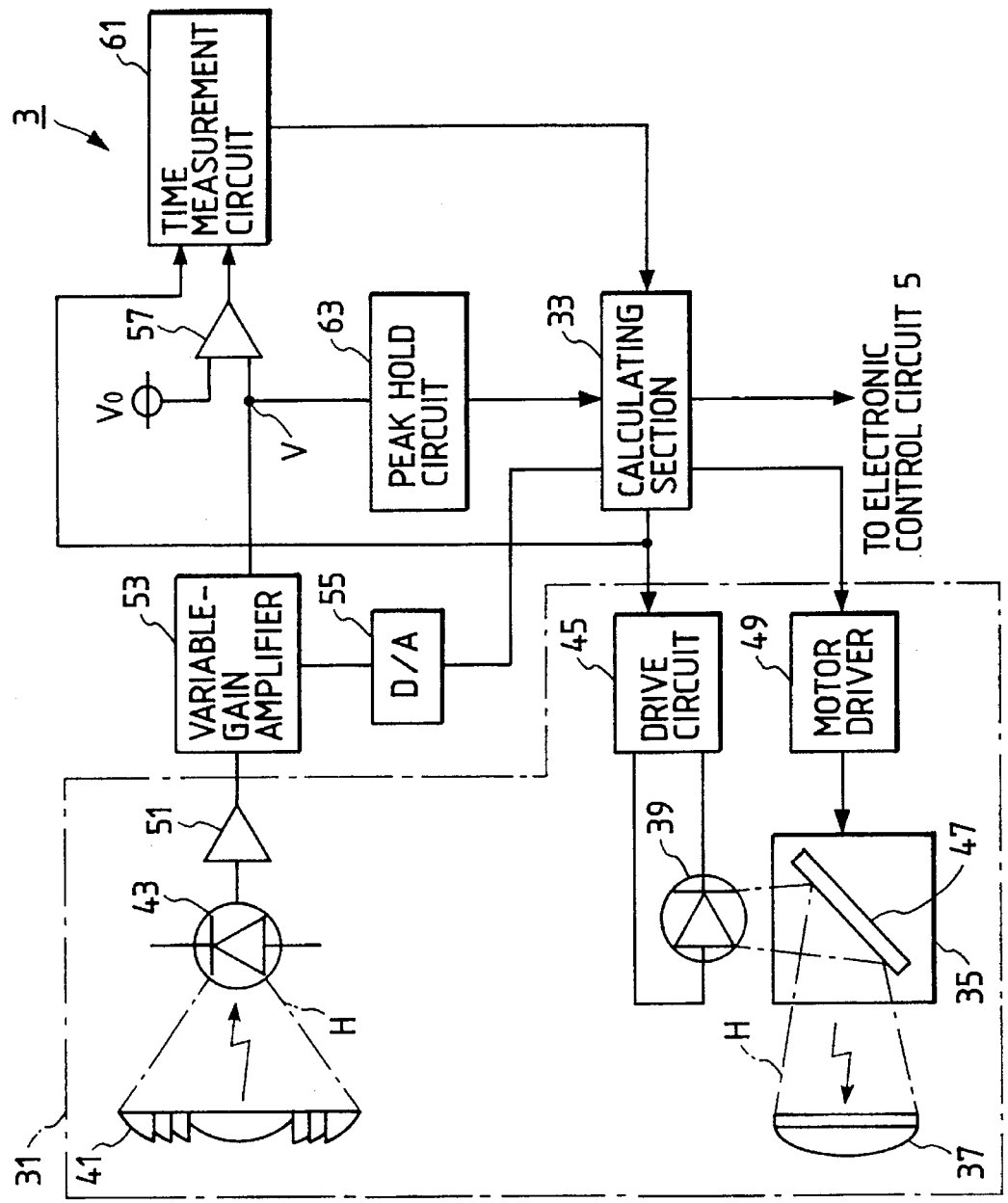
FIG. 5 is a block diagram of a scanning distance measurement device in FIG. 4.

As shown in FIG. 5, the scanning distance measurement device 3 includes a transmitting and receiving section 31 and a calculating section 33. The transmitting and receiving section 31 has a scan mirror arrangement 35, a light transmitting lens 37, a semiconductor laser diode 39, a condenser lens (a light receiving lens) 41, and a photodetector or a photosensor 43.

The laser diode 39 serves to emit pulses of a forward laser light beam H toward the scan mirror arrangement 35. The forward laser light beam H is reflected or deflected by the scan mirror arrangement 35 before being emitted via the light transmitting lens 37 into a given angular range in front of the subject vehicle. An obstacle (not shown) exposed to the forward laser light beam H causes an echo light beam or a reflected light beam H. The reflected light beam H is guided to photodetector 43 via the light receiving lens 41. The photodetector 43 outputs a signal having a voltage depending on the intensity of the received light beam H.

The laser diode 39 is connected to the calculating section 33 via a drive circuit 45. The drive circuit 45 intermittently and periodically activates the laser diode 39 in response to a control signal (a drive signal) fed from the calculating section 33. The intermittent and periodical activation of the laser diode 39 results in the emission of pulses of a forward laser light beam H from the laser diode 39. The scan mirror arrangement 35 has a mirror 47 which can be swung or rotated about a shaft extending vertically with respect to the subject vehicle. The mirror 47 is actuated by a motor (not shown) powered by a motor driver 49. The mirror 47 swings or rotates in response to a control signal (a drive signal) fed to the motor driver 49 from the calculating section 33. As the mirror 47 swings or rotates and hence the angular position of the mirror 47 varies, the direction of the forward laser light beam H is changed so that a given angular range in front of the subject vehicle is scanned by the forward laser light beam H.

The output signal of the photodetector 43 is fed via a preamplifier 51 to a variable-gain amplifier 53, being enlarged by the variable-gain amplifier 53. The variable-gain amplifier 53 is connected to the calculating section 33 via a D/A (digital-to-analog) converter 55. The calculating section 33 feeds the D/A converter 55 with a digital signal representing a designated gain. The D/A converter 55 changes the digital signal into a corresponding analog signal, and outputs the analog signal to the variable-gain amplifier 53. The gain of the variable-gain amplifier 53 is controlled at the designated gain represented by the output signal of the D/A converter 55. The variable-gain amplifier 53 outputs the amplification-resultant signal to a comparator 57 and a peak hold circuit 63. In addition, the comparator 57 is fed with a given voltage (a predetermined reference voltage) V0. The comparator 57 compares the voltage V of the output signal of the variable-gain amplifier 53 with the given voltage V0. When the voltage V of the output signal of the variable-gain amplifier 53 is higher than the given voltage V0, the comparator 57 feeds a time measurement circuit 61 with a given signal (a light-reception signal) representing the reception of a reflected light beam H.

In addition, the time measurement circuit 61 is informed of the drive signal fed to the drive circuit 45 from the calculating section 33. The time measurement circuit 61 measures the difference between the moment of the occurrence of the drive signal and the moment of the occurrence of the light-reception signal. The time measurement circuit 61 outputs a signal of the measured time difference to the calculating section 33.

The calculating section 33 has information of the current angular position of the mirror 47. The calculating section 33 calculates the distance between the subject vehicle and the obstacle, and the direction of the obstacle relative to the subject vehicle in response to the measured time difference and the related angular position of the mirror 47. The calculating section 33 feeds the electronic control circuit 5 with signals (one-dimensional distance data) representing the calculated distance and the calculated direction of the obstacle.

The peak hold circuit 63 serves to hold a maximal voltage of the output signal of the variable-gain amplifier 53. The peak hold circuit 63 feeds the calculating section 33 with a signal representing the maximal voltage of the output signal of the variable-gain amplifier 53.

Figure 6:
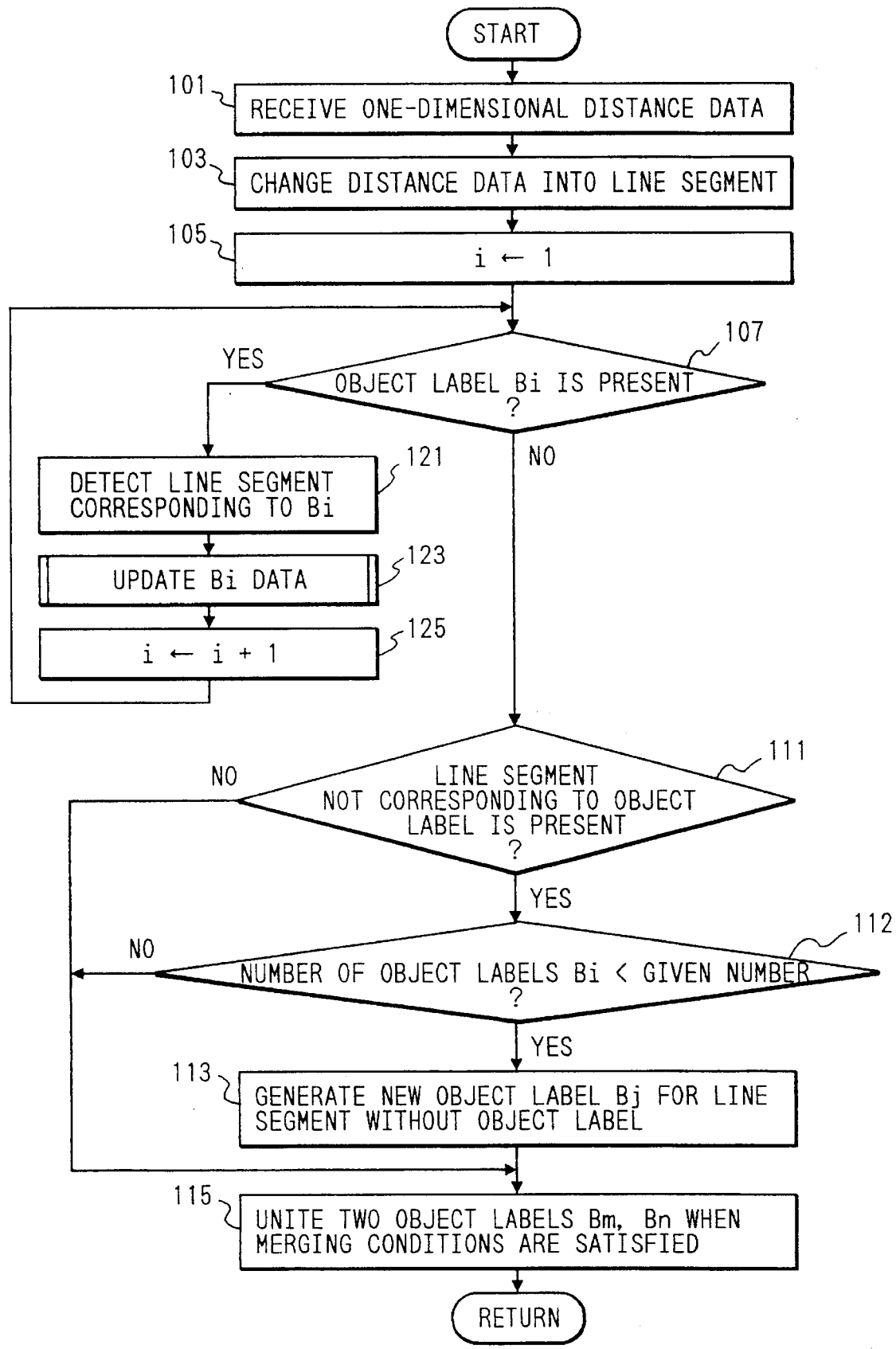
FIG. 6 is a flowchart of a portion of a program for operating an electronic control circuit In FIG. 4.

The electronic control circuit 5 includes a microcomputer or a similar device having a combination of an I/O port, a ROM, a RAM, and a CPU. The electronic control circuit 5 operates in accordance with a program stored in the ROM. FIG. 6 is a portion (a subroutine) of the program which relates to an obstacle recognizing process. The program portion In FIG. 6 is reiterated at a given period of, for example, 0.2 sec.

With reference to FIG. 6, a first step 101 of the program portion receives the one-dimensional distance data from the calculating section 33 (see FIG. 5). The step 101 subjects the one-dimensional distance data to given transform, recognizing or determining the position of every obstacle In orthogonal coordinates (X-Y orthogonal coordinates). The X-axis direction of the orthogonal coordinates corresponds to the width direction of the subject vehicle while the Y-axis direction of the orthogonal coordinates corresponds to the longitudinal direction of the subject vehicle. In addition, the origin of the orthogonal coordinates corresponds to the position of the center of the front of the subject vehicle.

The angular position of the mirror 47 is periodically changed step by step. Accordingly, the angular direction of the travel of the forward laser light beam H in front of the subject vehicle changes step by step. Every step in the change of the angular direction of the travel of the forward laser light beam H corresponds to a given angle (for example, 0.5°). Consequently, in the step 101, an obstacle or obstacles are recognized as (represented by) discrete points, for example, points P1, P2, P3, P4, P5, and P6 in the left-hand portion of FIG. 7.

A step 103 following the step 101 unites adjacent points among the points provided by the step 101. Specifically, the step 103 provides a set or sets each having adjacent points. These sets are referred to as the adjacent-point sets. The step 103 recognizes an obstacle corresponding to each adjacent-point set as a line segment having a length only along the width-direction of the subject vehicle. It should be noted that the length of a line segment is also referred to as the width in a later description.

Points spaced from each other by equal to or less than a given angular interval along the X-axis direction (the width direction of the subject vehicle) and by less than a given distance along the Y-axis direction (the longitudinal direction of the subject vehicle) are defined as adjacent points. The given angular interval along the X-axis direction corresponds to, for example, one step in the change of the angular direction of the travel of the forward laser light beam H. The given distance along the Y-axis direction is equal to, for example, 3.0 m.

Points spaced from each other by less than a given distance along the X-axis direction (the width direction of the subject vehicle) and by less than a given distance along the Y-axis direction (the longitudinal direction of the subject vehicle) may be defined as adjacent points. In this case, the given distance along the X-axis direction is equal to a value preferably in the range of 0.5 to 1 m. The given distance along the Y-axis direction is equal to, for example, 3.0 m.

Figure 7:
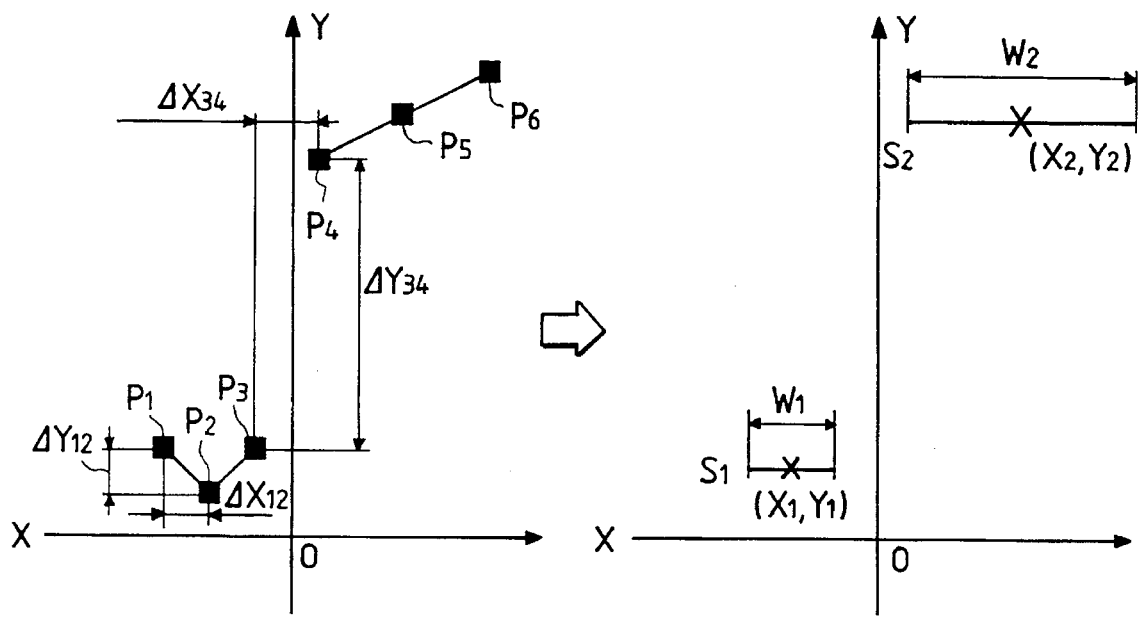
FIG. 7 is a diagram of adjacent-point sets and line segments.

In the example shown by the left-hand portion of FIG. 7, the points P1 and P2 are spaced from each other by equal to or less than the given angular interval along the X-axis direction and by less than the given distance along the Y-axis direction, and also the points P2 and P3 are spaced from each other by equal to or less than the given angular interval along the X-axis direction and by less than the given distance along the Y-axis direction. Therefore, the step 103 unites the points P1, P2, and P3 into a common adjacent-point set. On the other hand, the points P3 and P4 are spaced from each other by more than the given distance along the Y-axis direction so that the step 103 does not unite the points P3 and P4 into a common adjacent-point set. The points P4 and P5 are spaced from each other by equal to or less than the given angular interval along the X-axis direction and by less than the given distance along the Y-axis direction, and also the points P5 and P6 are spaced from each other by equal to or less than the given angular interval along the X-axis direction and by less than the given distance along the Y-axis direction. Therefore, the step 103 unites the points P4, P5, and P6 into a common adjacent-point set. Thus, in the example shown by the left-hand portion of FIG. 7, there are provided a first adjacent-point set having the points P1, P2, and P3, and a second adjacent-point set having the points P4, P5, and P6.

As previously described, the step 103 recognizes each adjacent-point set as a line segment having a length only along the X-axis direction (the width-direction of the subject vehicle). In other words, the step 103 converts each adjacent-point set into a line segment having a length only along the X-axis direction. The length of the line segment is set to the distance between the left-hand end point and the right-hand end point in the related set along the X-axis direction. In addition, the Y position of the line segment is set to a mean (an average) of the Y positions of all the points in the related set.

Regarding the example shown by FIG. 7, the set of the points P1, P2, and P3 is recognized as (converted into) a line segment S1 having a length W1 only along the X-axis direction while the set of the points P4, P5, and P6 is recognized as (converted into) a line segment S2 having a length W2 only along the X-axis direction. The length W1 of the line segment S1 is set to the distance between the left-hand end point P1 and the right-hand end point P2 along the X-axis direction. The Y position of the line segment S1 is set to a mean of the Y positions of the points P1, P2, and P3. On the other hand, the length W2 of the line segment S2 is set to the distance between the left-hand end point P4 and the right-hand end point P6 along the X-axis direction. The Y position of the line segment S2 is set to a mean of the Y positions of the points P4, P5, and P6.

In the electronic control circuit 5, the position of the center of every line segment provided by the step 103 is calculated or determined. Every line segment is defined by parameters including its center position and its length.

With reference to the example shown by the FIG. 7, the line segment S1 is defined by parameters including its center position (X1, Y1) and its length W1. In addition, the line segment S2 is defined by parameters including its center position (X2, Y2) and its length W2.

The step 103 calculates the dimension (the length) of every adjacent-point set along the Y-axis direction. The step 103 compares the calculated dimension with a predetermined reference dimension (equal to, for example, 6 m). In the case where the calculated dimension is equal to or greater than the reference dimension, the step 103 discards the data representing the related adjacent-point set. Thus, such an adjacent-point set is not recognized as a line segment. On the other hand, in the case where the calculated dimension is smaller than the reference dimension, the step 103 accepts the data representing the related adjacent-point set. Thus, such an adjacent-point set is recognized as a line segment.

A step 105 following the step 103 sets a variable "i" to 1. After the step 105, the program advances to a step 107. The step 107 determines whether an object label Bi corresponding to the number "i" is present or absent. As will be made clear later, "i" denotes a natural number and i=1, 2, ... so that Bi=B1, B2, .... The object label Bi corresponds to a model of an obstacle which is generated for a line segment. When an object label Bi is present, the program advances from the step 107 to a step 121. When an object label Bi is absent, the program advances from the step 107 to a step 111. At the moment of the execution of the step 107 during the first execution cycle of the program portion, no object label Bi is present. Therefore, the program advances from the step 107 to the step 111 during the first execution cycle of the program portion.

The step 111 determines whether or not at least one line segment to which an object label Bi has not yet been given is present. When at least one line segment to which an object label Bi has not yet been given is present, the program advances from the step 111 to a step 112. Otherwise, the program jumps from the step 111 to a step 115. During the first execution cycle of the program portion, if the step 103 provides at least one line segment, the program advances from the step 111 to the step 112 since an object label Bi has not yet been given to the line segment at the moment of the execution of the step 111.

The step 112 determines whether or not the number of object labels Bi is smaller than a given number. When the number of object labels Bi is smaller than the given number, the program advances from the step 112 to a step 113. Otherwise, the program jumps from the step 112 to the step 115. During the first execution cycle of the program portion, the number of object labels Bi is smaller than the given number at the moment of the execution of the step 112, and hence the program advances from the step 112 to the step 113.

In general, there is a certain upper limit of the number of obstacles which should be considered among obstacles detected via the scanning distance measurement device (the radar device) 3 using the laser light beam H. Examples of the obstacles which should be considered are preceding vehicles with respect to the subject vehicle. In most of cases where the number of obstacles detected via the scanning distance measurement device (the radar device) 3 is greater than the certain upper limit of the number of obstacles which should be considered, one or more of the detected obstacles agree with negligible road-side things. Accordingly, it is preferable that the given number used in the determination by the step 112 is greater than the previously-indicated upper limit of the number of obstacles by a preset appreciable number. In this case, data processing related to obstacles can be simplified while overlooking obstacles requiring consideration can be prevented.

The step 113 generates an object label Bj with respect to a line segment to which an object label has not yet been given. After the step 113, the program advances to the step 115. The step 113 repeats object-label generation twice or more in the case where a plurality of line segments are present. Specifically, object labels Bj (j=1, 2, ... ) are sequentially generated with respect to the line segments respectively. The object labels B1, B2, ... are sequentially assigned to the line segments in the order according to the degrees of the nearness of the line segments with respect to the subject vehicle. In more detail, the first object label B1 is given to the nearest line segment, and the second object label B2 is given to the second nearest line segment. During the sequential generation of object labels Bj, when the total number of the generated object labels Bj reaches the previously-indicated given number, the step 112 enables the step 113 to be skipped so that the generation of further object labels is prevented.

Every object label Bj has various data pieces, that is, a data piece representing the current coordinates (X, Y) of the center of the related line segment, a data piece representing the width (the X-direction length) W of the related line segment, a data piece representing the speed VX of the related line segment relative to the subject vehicle along the X-axis direction, a data piece representing the speed VY of the related line segment relative to the subject vehicle along the Y-axis direction, data pieces representing the four previous coordinates (X, Y) of the center of the related line segment, and a data piece representing a condition flag Fj.

During the generation of every object label BJ by the step 113, these data pieces are set as follows. The center position and the width of a related line segment are directly used in the data pieces representing the current center coordinates (X, Y) and the width W. The relative speed VX represented by the data piece is set to zero. The relative speed VY represented by the data piece is set to the speed of the subject vehicle which is multiplied by $-\frac{1}{2}$. The data pieces representing the four previous center coordinates (X, Y) are made vacant or empty. The condition flag Fj represented by the data piece is set to "0". As will be made clear later, the condition flag Fj is changeable among "0", "1", and "2". The condition flag FJ indicates which of an undecided state, a recognition state, and an extrapolation state the related object label Bj is in. Specifically, the condition flag Fj being "0" indicates that the object label Bj is in the undecided state. The condition flag FJ being "1" indicates that the object label Bj is in the recognition state. The condition flag Fj being "2" indicates that the object label Bj is in the extrapolation state. The definitions of the undecided state, the recognition state, and the extrapolation state will be described later.

The step 115 incorporates an object label Bn into an object label Bm when given merging conditions are met with respect to the object labels Bm and Bn. Specifically, the step 115 unites two object labels Bm and Bn into a new object label (a merging-resultant object label) Bm in the case where the following five merging conditions are satisfied with respect to the two object labels Bm and Bn.

The first merging condition is that the object label Bm is in the recognition state (Fm=1), and the obstacle related to the object label Bm remains recognized (detected) in six or more execution cycles of the program portion after the appearance thereof. The second merging condition is that the object label Bn is in the recognition state (Fn=1). The third merging condition is that the width Wm represented by the merging-resultant object label Bm is equal to 3.0 m or less as will be described later. The fourth merging condition is that the difference in the current center coordinates along the Y-axis direction between the object labels Bm and Bn is equal to 3.0 m or less. The fifth merging condition is that the difference in the relative speed VY between the object labels Bm and Bn is equal to 3.0 km/h or less.

The five merging conditions are suited to uniting object labels Bm and Bn into a new object label Bm in the case where left-hand and right-hand reflectors provided on the rear of a preceding vehicle are recognized (detected) as separate obstacles which correspond to the object labels Bm and Bn respectively.

When the five merging conditions are satisfied, the step 115 provides a new line segment having a length (a width) which extends between the left-hand edge and the right-hand edge of the combination of the line segments related to the object labels Bm and Bn. The Y coordinate of the center of the new line segment is equal to the mean value the average value) which results from weighting the Y coordinates of the line segments related to the object labels Bm and Bn while using the widths Wm and Wn of the line segments as weighting factors. The object label Bm is updated into agreement with the new line segment. Therefore, the width of the new line segment and the coordinates of the center of the new line segment are used as the width Wm and the current center coordinates (Xm, Ym) represented by the new object label Bm. The relative speed VX, the relative speed VY, the four previous center coordinates, and the condition flag Fm represented by the old object label Bm are used as the relative speed VX, the relative speed VY, the four previous center coordinates, and the condition flag Fm represented by the new object label Bm respectively. After the above-mentioned uniting process has been completed, the step 115 deletes or erases all the data pieces composing the object label Bn. The above-mentioned uniting process ensures that only one object label is generated for one preceding vehicle.

When the five merging conditions are not satisfied, the step 115 does not perform the above-mentioned uniting process. After the step 115, the current execution cycle of the program portion ends and the program returns to a main routine (not shown).

As previously described, the program advances from the step 107 to the step 121 when the step 107 finds an object label Bi to be present. The step 121 detects a line segment corresponding to the object label Bi.

Figure 8:
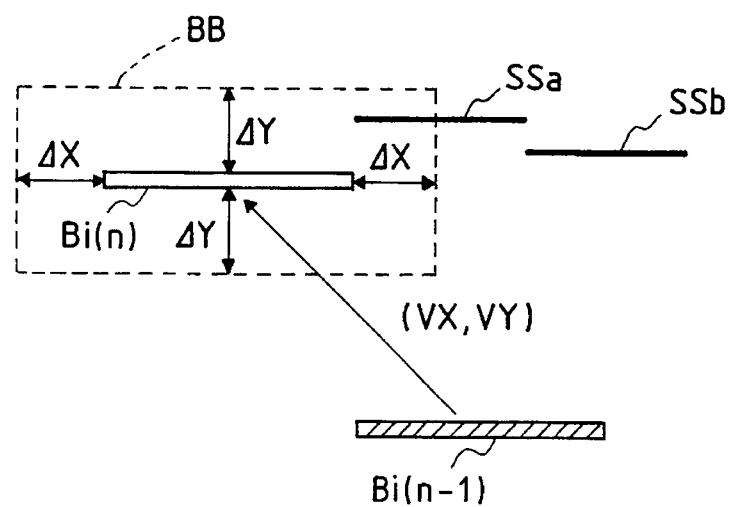
FIG. 8 is a diagram of a current position represented by an object label, a previous position represented by the object label, and an estimated destination area.

The definition of a line segment corresponding to the object label Bi will now be described. It is assumed that, as shown in FIG. 8, the position represented by the object label Bi moves from a position Bi(n−1) to a position (an estimated position) Bi(n) at a speed (VX, VY) where the position Bi(n−1) is provided in the immediately-preceding execution cycle of the program portion; the estimated position Bi(n) corresponds to an assumed position occurring in the current execution cycle of the program portion; and the speed (VX, VY) corresponds to a resultant of the relative speed VX and the relative speed VY provided in the immediately-preceding execution cycle of the program segment. An estimated destination area BB is set around the estimated position Bi(n). The estimated destination area BB is of a square shape having a given dimension ΔX along the X-axis direction and a given dimension ΔY along the Y-axis direction. A line segment SSa at least partially in the estimated destination area BB is defined as corresponding to the object label Bi. On the other hand, a line segment SSb fully outside the estimated destination area BB is defined as not corresponding to the object label Bi.

The given dimensions ΔX and ΔY are set as follows. In the case where the object label Bi is in the undecided state (Fi=0), the given dimension ΔX is set to 2.5 m while the given dimension ΔY is set to 5.0 m. In the case where the object label Bi is in the recognition state (Fi=1) and the time elapsed since the appearance of the object label Bi corresponds to less than six execution cycles of the program portion, the given dimension ΔX is set to 2.0 m while the given dimension ΔY is set to 4.0 m. In the case where the object label Bi is in the recognition state (Fi=1) and the time elapsed since the appearance of the object label Bi corresponds to six or more execution cycles of the program portion, the given dimension ΔX is set to 1.5 m while the given dimension ΔY is set to 3.0 m. In the case where the object label Bi is in the extrapolation state (Fi=2), the given dimension ΔX is set to 1.5 m while the given dimension ΔY is set to 3.0 m.

When there are a plurality of line segments at least partially in the estimated destination area BB, the step 121 selects one of the line segments as corresponding to the object label Bi in a way which will be described later.

A block 123 following the step 121 updates the object label Bi. The details of the updating block 123 will be described later. A step 125 following the block 123 increments the number "i" by "1" according to the statement as "i=i+1". After the step 125, the program returns to the step 107.

Figure 9:
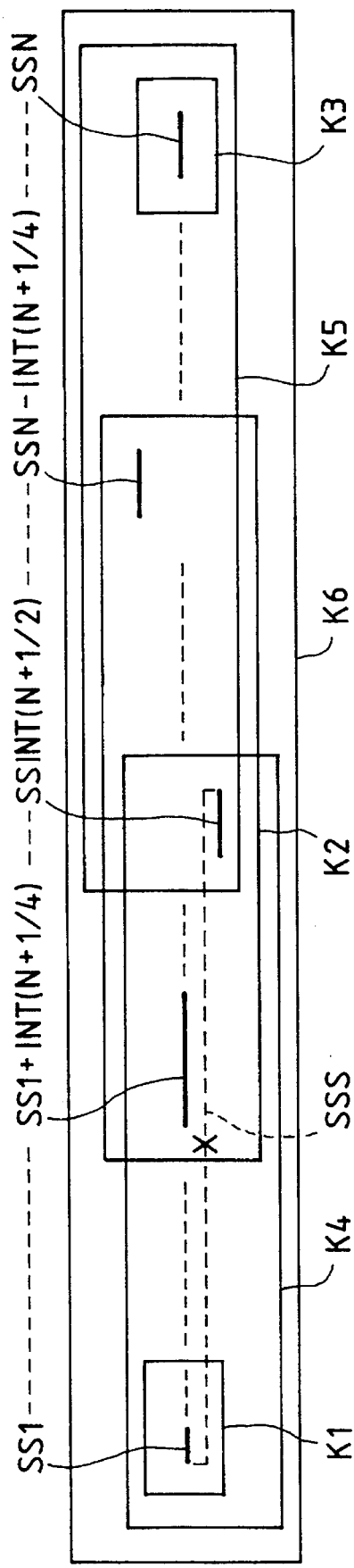
FIG. 9 is a diagram of line segments and candidates.

The step 121 will now be further described. As previously described, the step 121 has the function of selecting one of line segments at least partially in the estimated destination area BB. The selection of one of the line segments is executed as follows. It is assumed that there are N line segments at least partially in the estimated destination area BB. Numbers SS1, SS2, ..., SSN are sequentially assigned to the N line segments in the order according to the positions of the N line segments in the direction from the left to the right. As shown in FIG. 9, five line segments SS1, SS1+INT(+¼), SSINT(N+½), SSN-INT(N+¼), and SSN are selected from among the N line segments SS1, SS2, ..., SSN. Here, INT(N+¼) means INT{(N+1)/4}, and INT(N+½) means INT{(N+1)/2}. In addition, "INT" means an operator denoting the integer part of the numerical value in the subsequent parentheses. For example, In the case of N=10, INT(N+¼) means "2" while INT(N+½") means "5". Accordingly, in this case, the line segments SS1, SS3, SS5, SS8, and SS10 are selected.

Subsequently, as shown in FIG. 9, six candidates K1, K2, K3, K4, K5, and K6 are generated on the basis of the five selected line segments. The candidate K1 is composed of only the line segment SS1. The candidate K2 is composed of the line segments SS1+INT(N+¼) to SSN−INT(N+¼). The candidate K3 is composed of only the line segment SSN.

The candidate K4 is composed of the line segments SS1 to SSINT(N+½). The candidate K5 is composed of the line segments SSINT(N+½) to SSN. The candidate K6 is composed of all the line segments SS1 to SSN.

The line segments SS in each of the candidates K2, K4, K5, and K6 are united similarly to the previously-mentioned uniting process (the previously-mentioned merging process). As a result, center coordinates and a width (a length) are provided for each of the candidates K1, K2, K3, K4, K5, and K6. Center coordinates related to every candidate is compared with the center coordinates represented by the object label Bi at the estimated position Bi(n), and hence the X-direction difference ΔXk and the Y-direction difference ΔYk therebetween are calculated. A width related to every candidate is compared with the width represented by the object label Bi at the estimated position Bi(n), and hence the difference ΔWk therebetween is calculated. A set of the calculated differences ΔXk, ΔYk, and ΔWk is evaluated by referring to the following performance index (the following evaluation function) Pidx.

$$Pidx=\alpha\cdot\Delta Xk+\beta\cdot\Delta Yk+\gamma\cdot\Delta Wk$$

where "α", "β", and "γ" denote coefficients predetermined in accordance with characteristics of the scanning distance measurement device 3. For example, the predetermined coefficients "α", "β", and "γ" are equal to 1. The performance indexes Pidx are calculated for the candidates K1, K2, K3, K4, K5, and K6 respectively. The six performance indexes Pidx are compared with each other, and the minimum performance index is determined from among the six performance Indexes Pidx. One of the candidates K1, K2, K3, K4, K5, and K6 is selected which corresponds to the minimum performance index. The center coordinates and the width related to the selected candidate are used as the center coordinates and the width represented by the line segment corresponding to the object label Bi.

With reference to FIG. 9, for example, in the case where the candidate K4 is selected from among the candidates K1, K2, K3, K4, K5, and K6, the line segment SSS is used as a line segment corresponding to the object label Bi. After the selection of the line segment corresponding to the object label Bi has been completed, the other line segments are considered as not corresponding to the object label Bi and are thus disregarded.

The above-indicated processing by the step 121 makes it possible to accurately judge whether or not a line segment currently provided by the step 103 is the same as a previously-provided line segment. Here, "same" means that the currently-provided line segment and the previously-provided line segment correspond to the same obstacle.

Figure 10:
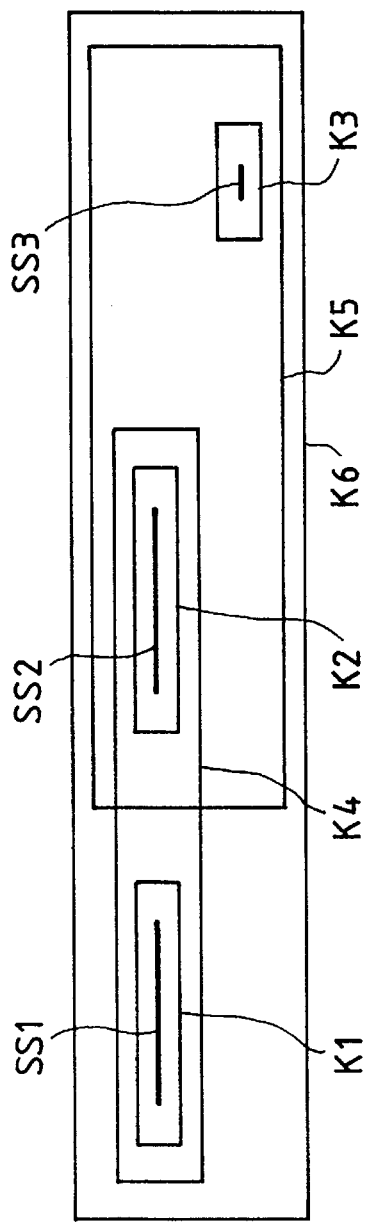
FIG. 10 is a diagram of line segments and candidates.

In the case where the number of line segments at least partially in the estimated destination area BB is between 2 and 4, duplicate use of line segments is permitted in the five line segments SS1, SS1+INT(N+¼), SSINT(N+½), SSN-INT(N+¼), and SSN. For example, in the case of N=3, INT(N+¼)=1 and INT(N+½)=2 so that the line segments SS1, SS2, SS2, SS2, and SS3 are selected as the five line segments. In this case, as shown in FIG. 10, the candidate K2 is composed of only the line segment SS2 while the candidate K4 is composed of the line segments SS1 and SS2. In addition, the candidate K5 is composed of the line segments SS2 and SS3.

Figure 11:
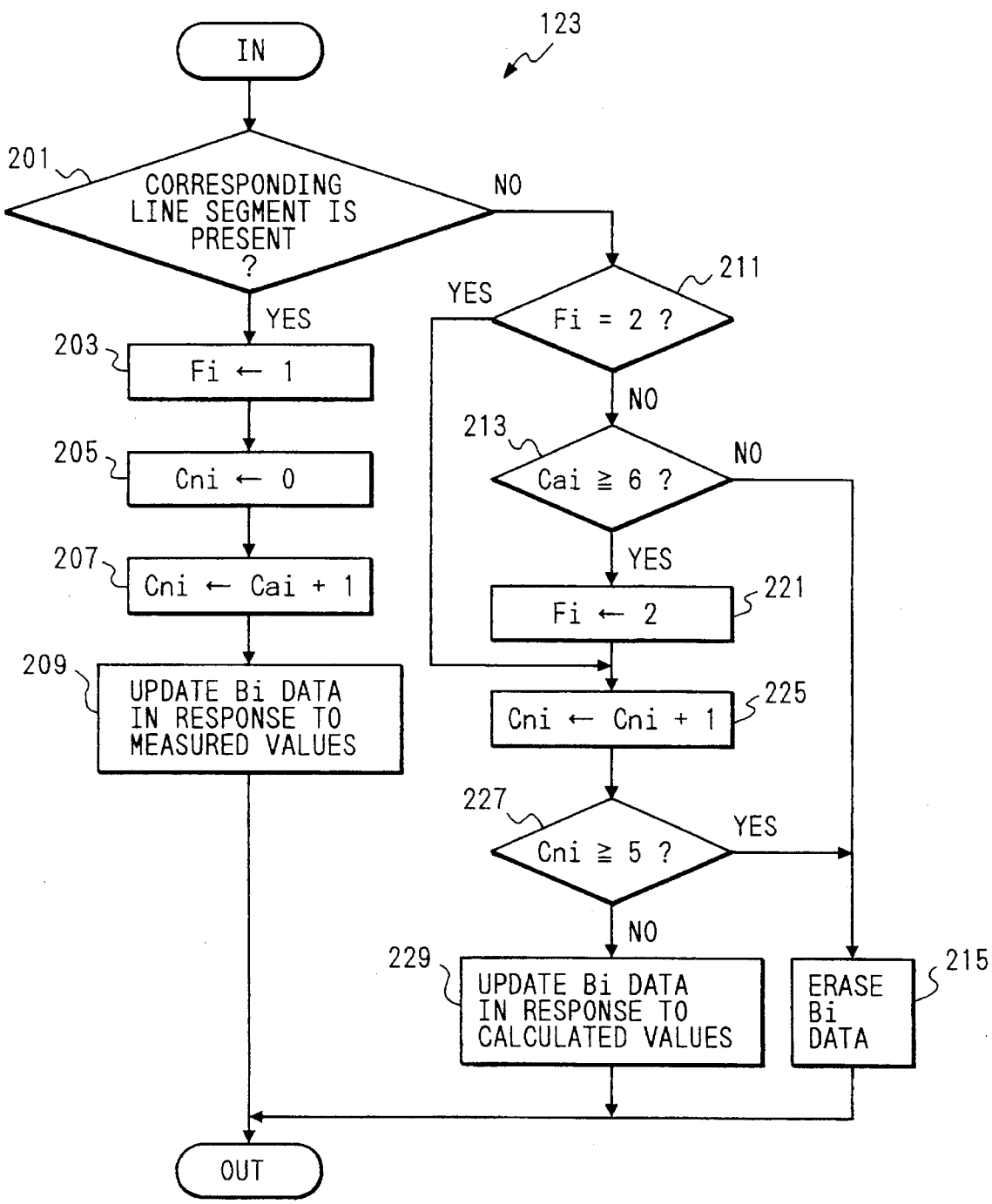
FIG. 11 is a flowchart of the details of an updating block in FIG. 6.

FIG. 11 shows the details of the updating block 123 in FIG. 6. With reference to FIG. 11, the updating block 123 has a first step 201 which follows the step 121 in FIG. 6. The step 201 determines whether or not the preceding step 121 has detected the line segment corresponding to the object label Bi. When the line segment corresponding to the object label Bi has been detected, the program advances from the step 201 to a step 203. Otherwise, the program advances from the step 201 to a step 211.

When the line segment corresponding to the object label Bi has been detected, the object label Bi is regarded as being in the recognition state and hence the step 203 sets the condition flag Fi to "1". A step 205 following the step 203 resets a value Cni to "0". The value Cni denotes a counter which serves to count the number of times of the occurrence of the fact that the line segment corresponding to the object label Bi has not been detected by the step 121. A step 207 following the step 205 increments a value Cai by "1" according to the statement as "Cai=Cai+1". The value Cai denotes a counter which serves to count the number of times of the occurrence of the fact that the line segment corresponding to the object label Bi has been detected by the step 121. A step 209 following the step 207 updates the data in the object label Bi in response to the data representing the line segment corresponding to the object label Bi. After the step 209, the program exits from the updating block 123 and proceeds to the step 125 in FIG. 6.

The function of the step 209 will now be described in more detail. As previously described, regarding the line segment corresponding to the object label Bi, there are a data piece representing center coordinates and a data piece representing a width. The data piece representing the center coordinates is denoted by (Xs, Ys) while the data piece representing the width is denoted by Ws. New center coordinates represented by the label Bi are set equal to the center coordinates (Xs, Ys). In addition, a new width represented by the label Bi is set equal to the width Ws. Furthermore, new relative speeds (VX, VY) represented by the object label Bi are set by referring to the following equation.

$$(VX, VY) = \left( \frac{Xs - Xk}{dt} , \frac{Ys - Yk}{dt} \right)$$

where (Xk, Yk) denotes the oldest center coordinates represented by the object label Bi among the four previous center coordinates, and "dt" denotes the time elapsed since the moment of the measurement of the oldest center coordinates.

As previously described, when the line segment corresponding to the object label Bi has not been detected by the step 201, the program advances from the step 201 to the step 211. The step 211 determines whether or not the condition flag Fi in the object label Bi is "2", that is, whether or not the object label Bi is in the extrapolation state. When the condition flag Fi in the object label Bi is not "2", the program advances from the step 211 to a step 213. On the other hand, when the condition flag Fi in the object label Bi is "2", the program jumps from the step 211 to a step 225. In the case where the program advances to the step 211 for the first time, the condition flag Fi in the object label Bi is "0" or "1" so that the program subsequently advances from the step 211 to the step 213.

The step 213 compares the counter value Cai with a predetermined number, for example, "6". When the counter value Cai is smaller than "6", the program advances from the step 213 to a step 215. On the other hand, when the counter value Cai is equal to or greater than "6", the program advances from the step 213 to a step 221.

The step 215 erases or deletes all the data pieces related to the object label Bi. After the step 215, the program exits from the updating block 123 and proceeds to the step 125 in FIG. 6.

Accordingly, while the line segment corresponding to the object label Bi remains successively detected, the sequence of the steps 201, 203, 205, 207, and 209 is periodically executed so that the counter value Cai continues to be incremented by the step 207. On the other hand, in the case where the line segment corresponding to the object label Bi disappears in an interval corresponding to less than the six execution cycles of the program portion after the appearance thereof, the program advances from the step 213 to the step 215 so that all the data pieces related to the object label Bi are erased or deleted by the step 215. Thus, it is possible to erase or delete the data pieces of the object label Bi corresponding to a temporarily-detected obstacle. Such a temporarily-detected obstacle generally agrees with a negligible road-side thing, and hence the deletion of the data pieces causes an increase in the accuracy of the recognition of an obstacle to be considered.

As previously described, when the counter value Cai is equal to or greater than "6", the program advances from the step 213 to the step 221. Thus, in the case where the line segment corresponding to the object label Bi disappears in an interval corresponding to at least the six execution cycles of the program portion after the appearance thereof, the step 221 is executed. The step 221 regards the object label Bi as being in the extrapolation state, and sets the condition flag Fi in the object label Bi to "2". After the step 221, the program advances to the step 225.

The step 225 increments the counter value Cni by "1" according to the statement as "Cni=Cni+1". A step 227 following the step 225 compares the counter value Cni with "5". When the counter value Cni is smaller than "5", the program advances from the step 227 to a step 229. On the other hand, when the counter value Cni is equal to or greater than "5", the program advances from the step 227 to the step 215.

The step 229 updates the data in the object label Bi in response to calculated values. Specifically, the step 229 calculates new center coordinates (X, Y) represented by the object label Bi while the previously-indicated relative speeds (VX, VY) and the previously-indicated width W are presumed to be unchanged. Then, the step 229 replaces the old center-coordinate date piece by the new center-coordinate data piece in the object label Bi. After the step 229, the program exits from the updating block 123 and proceeds to the step 125 in FIG. 6.

Accordingly, in the case where the line segment corresponding to the object label Bi disappears in an interval corresponding to at least the six execution cycles of the program portion after the appearance thereof, the step 221 sets the condition flag Fi in the object label Bi to "2" representing the extrapolation state. Then, the step 229 updates the data in the object label Bi in response to the calculated values. In addition, the counter value Cni is incremented by the step 225. In the case where the counter value Cni reaches "5" or more, that is, in the case where a line segment corresponding to the object label Bi continues to be not detected during at least the five execution cycles of the program portion, the program advances to the step 215 so that all the data pieces in the object label Bi are erased or deleted by the step 215.

Therefore, in the case where an obstacle (corresponding to the object label Bi) temporarily disappears after the obstacle continues to be detected during at least the six execution cycles of the program portion, the obstacle is pursued while being recognized as the same provided that the obstacle is detected again at the step 201.

As understood from the previous description, regarding an obstacle which remains detected during at least the given interval before the disappearance thereof, data representing the obstacle continues to be updated in response to calculated values during a preset period after the disappearance. Therefore, even in the case where a reflected light beam from an obstacle is temporarily undetected and is then detected again, the obstacle can be suitably pursued. On the other hand, in the case where an obstacle continues to be undetected during at least the preset period, it is thought that the obstacle has actually disappeared. In this case, the data representing the obstacle is erased. Accordingly, wrong detection of an obstacle can be prevented, and the load on the electronic control circuit 5 can be reduced. Thus, it is possible to enhance the speed and the accuracy of the processing related to obstacle recognition.

With reference back to FIG. 6, when the data pieces in all the object labels Bi (i=1, 2, . . . ) have been updated by the loop of the steps 107, 121, 123, and 125, there is no object label Bi corresponding to the latest number "i". Accordingly, in this case, the program advances from the step 107 to the step 111. When there is at least one line segment which does not correspond to any object labels Bi (the step 111), the program advances to the step 112. Then, a new object label or new object labels BJ are generated for the line segment or the line segments which do not correspond to any object labels Bi (the step 113). During the generation of the new object labels Bj, the natural number denoted by the adscript "j" is started from the minimum number. It should be noted that the total number of object labels is limited to less than the given number used in the step 112. Subsequently, the program advances to the step 115. On the other hand, in the case where every line segment corresponds to one of the object labels Bi (the step 111), the program jumps to the step 115.

The vehicle control system 1 containing the obstacle recognition system according to this embodiment has advantages as follows. In this embodiment, it is possible to suitably judge whether or not a currently-recognized obstacle and a previously-recognized obstacle are the same. In addition, it is possible to accurately calculate the relative speeds (VX, VY) of an obstacle relative to the subject vehicle.

A judgment as to whether an obstacle is moving or stationary can be accurately executed by the following processes. An obstacle represented by an object label Bi is regarded as being stationary when the relative speed VY indicated by the object label Bi satisfies the relation "–VY> subject vehicle speed ×0.7" or the relation "VY +subject vehicle speed ≦10 km/h". An obstacle represented by an object label Bi is regarded as being moving when the relative speed VY indicated by the object label Bi satisfies the relation "–VY> subject vehicle speed ×0.5" and the relation "VY+ subject vehicle speed >20 km/h". Such processes can prevent a stationary object from being erroneously recognized as a moving vehicle.

In this embodiment, an obstacle is recognized as a line segment having a length only along the width direction of the subject vehicle. Therefore, the number of necessary parameters denoting an obstacle is relatively small. The smaller number of necessary parameters simplifies a process of estimating a future position of an obstacle and a process of judging whether or not a currently-recognized obstacle and a previously-recognized obstacle are the same.

According to this embodiment, in the case of a set of adjacent points which extends along the longitudinal direction (the Y-axis direction) of the subject vehicle for 6 m or more, the adjacent-point set is not recognized as a line segment and the data pieces of all the points are discarded. Accordingly, it is possible to neglect a guardrail or a similar thing elongated along a road side. This neglect simplifies the processing executed by the loop of the steps 107, 121, 123, and 125, and decreases the load on the electronic control circuit 5. Thus, it is possible to enhance the speed and the accuracy of the processing related to obstacle recognition.

In this embodiment, the total number of object labels Bi is limited to less than the given number used in the step 112. Thereby, the processing executed by the loop of the steps 107, 121, 123, and 125 can be simplified, and the load on the electronic control circuit 5 can be decreased. Thus, it is possible to further enhance the speed and the accuracy of the processing related to obstacle recognition.

In this embodiment, regarding line segments which do not correspond to any object labels, the step 113 sequentially generates new object labels Bj for the line segments in the order according to the degrees of the nearness of the line segments with respect to the subject vehicle. Thus, it is possible to more suitably recognize an obstacle near the subject vehicle. In addition, even when the upper limit of the total number of object labels Bi is set relatively small, reliable collision avoidance is enabled with respect to the subject vehicle. Furthermore, the processing executed by the loop of the steps 107, 121, 123, and 125 can be simplified, and the load on the electronic control circuit 5 can be decreased. Thus, it is possible to further enhance the speed and the accuracy of the processing related to obstacle recognition.

In this embodiment, when there are a plurality of line segments SS1–SSN (candidates K) recognized as corresponding to an object label Bi, the degrees of the identities related to the line segments SS1–SSN (the candidates K) are compared with each other to detect the greatest degree. The line segment or the candidate related to the highest-degree identity is considered to be the same as the previously-provided line segment corresponding to the object label Bi, and the processing Is continued. Accordingly, it is possible to suitably pursue an obstacle corresponding to the object label Bi.

The degrees of the identities are compared with each other on the basis of the center coordinates and the widths of the line segments SS1–SSN or the candidates K. Therefore, the comparison between the degrees of the identities can be more accurate in comparison with the case where the degrees of the identities are compared with each other on the basis of only the center coordinates of the line segments SS1–SSN or the candidates K. Thus, it is possible to more accurately pursue an obstacle corresponding to the object label Bi.

In FIG. 6 of this embodiment, the step 101 corresponds to point recognizing means. The step 103 for uniting adjacent points corresponds to uniting means. The step 121 for setting an estimated destination area BB corresponds to position estimating means. The step 121 for detecting a line segment SS or a candidate K related to the object label Bi corresponds to identity judging means. The step 121 for selecting a line segment or a candidate K related to the object label Bi according to the performance indexes corresponds to identity comparing means. The steps 112 and 113 provide the function of preventing the generation of further object labels when the total number of object labels BJ reaches the given number. The steps 112 and 113 corresponds to line-segment excepting means.

In this embodiment, the scanning distance measurement device 3 may be modified to use a millimeter radio wave beam instead of the laser light beam H.

What is claimed is:

1. An obstacle recognition system for a vehicle, comprising:
    a) radar means for emitting a wave beam into a given angular range outside the vehicle and scanning the given angular range by the wave beam, and for detecting a reflected wave beam; and
    b) recognizing means for recognizing an obstacle with respect to the vehicle on the basis of the result of detection of the reflected wave beam by the radar means;
   wherein the recognizing means comprises:
    b1) point recognizing means for recognizes obstacles as points on the basis of the result of detection of the reflected wave beam by the radar means;
    b2) uniting means for uniting adjacent points among the points provided by the point recognizing means, and for providing sets each having adjacent points;
    b3) line-segment recognizing means for detecting a specific set or specific sets of adjacent points among the adjacent-point sets provided by the uniting means, and for recognizing every detected specific set as a line segment having a length only along a width direction of the vehicle, wherein every specific set has a length smaller than a given length along a longitudinal direction of the vehicle;
    b4) position estimating means for estimating the position of a line segment, which will be provided by the line-segment recognizing means, in response to the position of a previously-provided line segment; and
    b5) identity judging means for comparing the line-segment position estimated by the position estimating means and the position of a line segment currently provided by the line-segment recognizing means to judge whether or not the line segment currently provided by the line-segment recognizing means and the previously-provided line segment are the same.

2. An obstacle recognition system for a vehicle, comprising:
    a) radar means for emitting a wave beam into a given angular range outside the vehicle and scanning the given angular range by the wave beam, and for detecting a reflected wave beam; and
    b) recognizing means for recognizing an obstacle with respect to the vehicle on the basis of the result of detection of the reflected wave beam by the radar means;
   wherein the recognizing means comprises:
    b1) point recognizing means for recognizes obstacles as points on the basis of the result of detection of the reflected wave beam by the radar means;
    b2) uniting means for uniting adjacent points among the points provided by the point recognizing means, and for providing sets each having adjacent points;
    b3) line-segment recognizing means for recognizing each of the adjacent-point sets as a line segment having a length only along a width direction of the vehicle;
    b4) position estimating means for estimating the position of a line segment, which will be provided by the line-segment recognizing means, in response to the position of a previously-provided line segment;
    b5) identity judging means for comparing the line-segment position estimated by the position estimating means and the position of a line segment currently provided by the line-segment recognizing means to judge whether or not the line segment currently provided by the line-segment recognizing means and the previously-provided line segment are the same; and b6) line-segment excepting means for, in cases where the number of line segments currently provided by the line-segment recognizing means exceeds a given number, detecting a specific line segment or specific line segments among the currently-provided line segments and excluding the specific line segment or at least one of the specific line segments from a next position estimating process and a next identity Judging process executed by the position estimating means and the identity judging means, wherein the specific line segment or the specific line segments are judged by the identity judging means as being different from previously-provided line segments.

3. The obstacle recognition system of claim 2, wherein the line-segment excepting means is operative for, in cases where the number of line segments currently provided by the line-segment recognizing means exceeds the given number, sequentially excluding the specific line segments in the order according to the degrees of the separations of the specific line segments from the vehicle, wherein the number of the excluded specific line segments is equal to the total number of the line segments provided by the line-segment recognizing means minus the given number.

* * * * *